United States Patent [19]

Blackwood et al.

[11] 4,369,024

[45] Jan. 18, 1983

[54] BRICK MOLDING MACHINE

[76] Inventors: Rodger Blackwood, R.R. #1, DeWinton, Alberta; John G. Medway, Box 1210, High River, Alberta, both of Canada

[21] Appl. No.: 273,426

[22] Filed: Jun. 15, 1981

[30] Foreign Application Priority Data

Jun. 13, 1980 [CA] Canada .................................. 353997

[51] Int. Cl.$^3$ .............................................. B29C 17/00

[52] U.S. Cl. ................................ 425/112; 425/126 R; 425/253; 425/255; 425/351

[58] Field of Search ............. 425/215, 98, 112, 126 R, 425/253, 351, 429

[56] References Cited

U.S. PATENT DOCUMENTS 131,898 10/1872 Partz .................................. 425/351

3,932,098 1/1976 Huber .................................. 425/412

*Primary Examiner*—John A. Parrish

*Attorney, Agent, or Firm*—William R. Hinds; George H. Dunsmuir

[57] ABSTRACT

A table top brick molding machine includes a table defined by a top and legs, the top incorporating a grid open at its top and bottom for defining the sides of molds for receiving brick forming composition; a hopper for dispensing the brick forming composition into the grid; a chain and sprocket drive connected to the hopper for moving the hopper along tracks on the table top above the grid; a shelf beneath the grid for supporting a pallet on a carrier; and a lever system for raising the pallet against the bottom of the grid to complete the molds, and for lowering the pallet and carrier onto the shelf for removal laterally from beneath the table.

10 Claims, 6 Drawing Figures

1
4
5
6
7
8
12
13
14
15
16
17
18
19
20
22
23
31
34
35
36
37
41
44
45
46
47
69
70
71
IV

BRICK MOLDING MACHINE

BACKGROUND OF THE INVENTION

This invention relates to a brick molding machine and in particular to a table top brick molding machine.

The patent art is not replete with patents relating to machines or apparatuses for molding bricks or the like. The art in this field of endeavour is typified by U.S. Pat. No. 2,036,367, issued to A. R. Shinn et al. on Apr. 7, 1936; U.S. Pat. No. 2,501,136, issued to L. C. Miller on Mar. 21, 1950; U.S. Pat. No. 2,562,541, issued to S. Flam on July 31, 1951; and U.S. Pat. No. 2,641,819, issued to C. Pearcy on June 16, 1953. A review of such patent art makes it readily apparent that the brick molding field is one area where there is room for improvement. Most of the prior art machines are somewhat bulky, complicated and cumbersome.

The object of the present invention is to provide a relatively simple brick molding machine of the table top type, i.e., a machine in which bricks are efficiently molded at table top level.

SUMMARY OF THE INVENTION

Such object is achieved by a brick molding machine comprising table means, said table means including a top and legs supporting said top; grid means in said top for defining sides of molds for molding bricks; shelf means beneath said grid means; carrier means on said shelf means for carrying a pallet; elevating means for moving said pallet carrier and a pallet from a rest position on said shelf to a molding position in which said pallet abuts the bottom of said grid means to define the bottom of said molds; hopper means for dispensing brick forming composition into said molds; and drive means for moving said hopper means along said table top above the molds.

BRIEF DESCRIPTION OF THE DRAWINGS

The invention will now be described in greater detail with reference to the accompanying drawings, which illustrate a preferred embodiment of the invention, and wherein.

DESCRIPTION OF THE PREFERRED EMBODIMENT(S)

Figure 1:
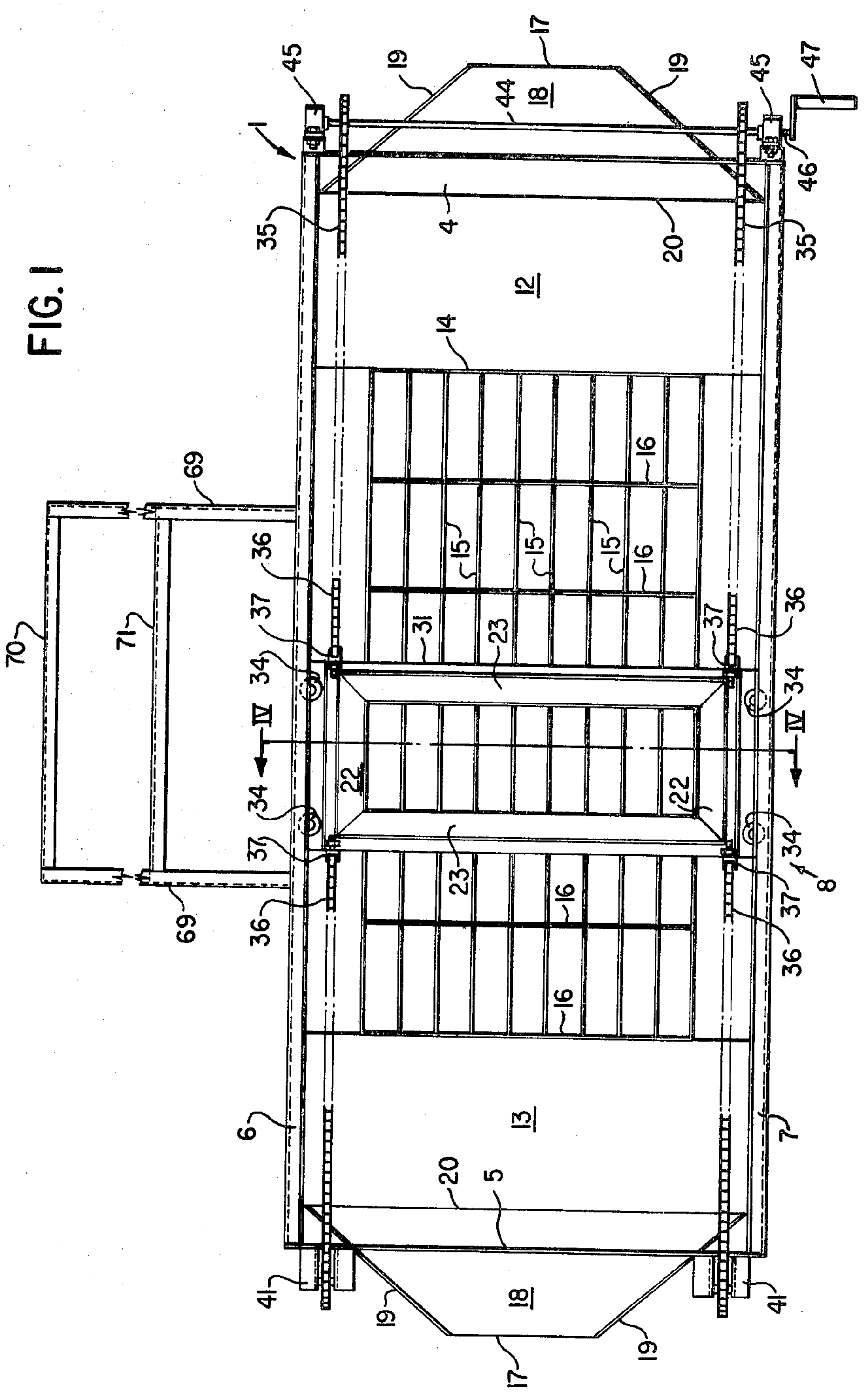
FIG. 1 is a plan view of a brick molding machine in accordance with the present invention.

With reference to the drawings, the preferred embodiment of the brick molding machine of the present invention includes a table generally indicated at 1 defined by a top 2 and four corner legs 3. The top 2 is a rectangular frame including a pair of planar ends 4 and 5, and sides 6 and 7. The sides 6 and 7 are defined by angle irons which are connected to the ends 4 and 5 in a manner such that they define opposed, inwardly opening V-shaped tracks for slidably supporting a hopper generally indicated at 8. The legs 3 are connected to the sides 6 and 7 near the ends thereof. Diagonal reinforcing braces 9 extend between each of the sides 6 and 7 near the ends thereof and the legs 3. Crossbars 10 extend between the pair of legs 3 at each end of the table near the bottom end thereof, and diagonal end braces 11 interconnect such pair of legs and one end of one crossbar 10 to ensure that the frame remains rigid.

Figure 4:
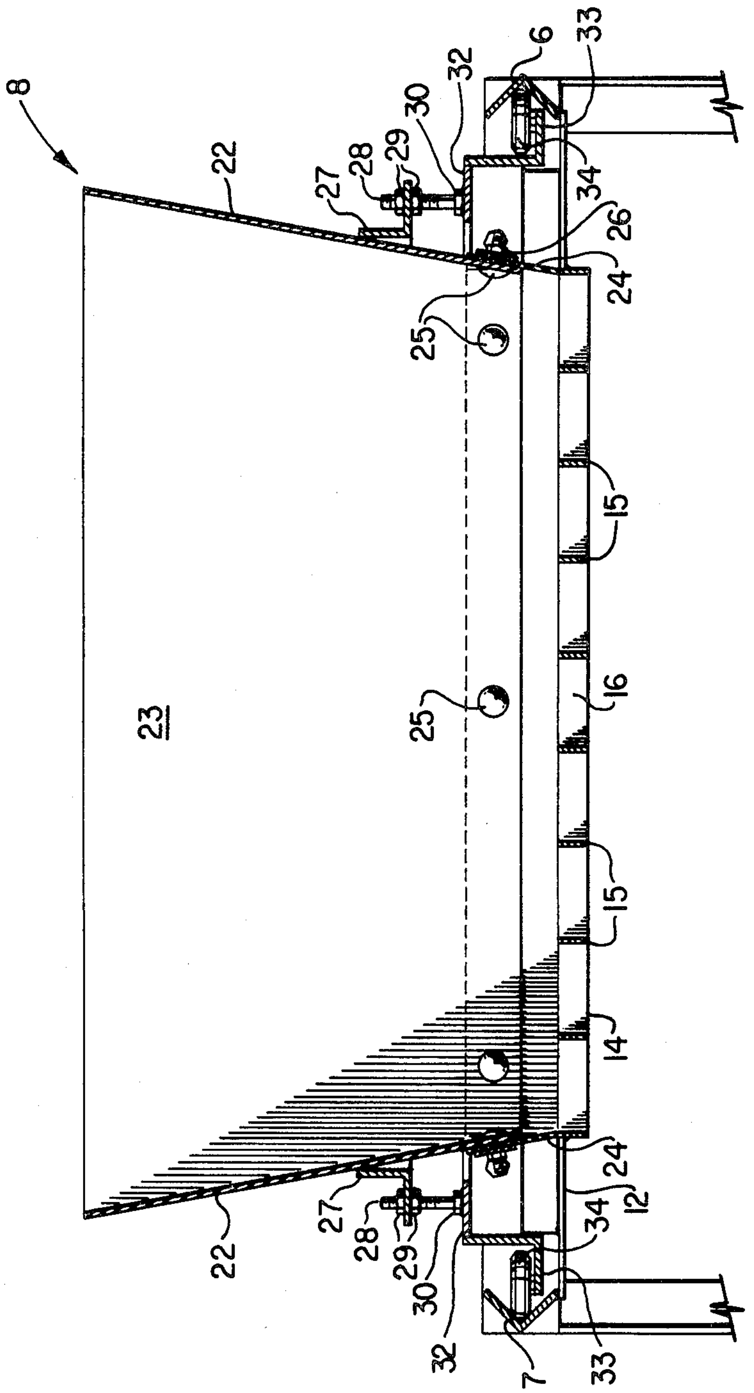
FIG. 4 is a cross-sectional view of a hopper used in the machine of FIGS. 1 to 3 taken generally along line IV—IV of FIG. 1.

The top 2 is completed by a pair of planar end panels 12 and 13, and a thin, rectangular grid 14. The grid 14 is defined by longitudinally and transversely extending metal strips 15 and 16, respectively which define the sides of brick molds. As best illustrated in FIG. 4, the top surfaces of the panels 12 and 13 are flush with the open top end of the grid 14. An inclined, outwardly tapering drip chute 17 is provided at each end of the table 1. Each chute 17 is defined by a bottom plate 18 and sides 19. The inner ends 20 of the bottom plates 18 are connected to the outer ends of the panels 12 and 13, and reinforcing rods 21 extend between the bottom of the tray and the ends of the table 1.

As mentioned hereinbefore, the table 1 slidably supports the hopper 8. The hopper 8 includes inclined side and end walls 22 and 23, respectively. (The terms "side" and "end" are chosen with respect to the direction of travel of the hopper 8 on the table 1. The side walls 22 are parallel to the sides 6 and 7 of the table, and the end walls 23 are parallel to the ends of the table). A rubber strip 24 is connected to the bottom edge of each side and end wall 22 and 23. Thus, the strips 24 extend around the entire bottom periphery of the hopper 8. The strips 24 are connected to such side and end walls by bolts 25 and nuts 26. An L-shaped supporting bar 27 is connected to each side 22 of the hopper 8. A bolt 28 passes through each end of each of the bars 27 and is held in position by nuts 29, which permit levelling of the hopper 8. The heads 30 of the bolts 28 rest on a hopper carrier 31 defined by a rectangular frame extending completely around the lower periphery of the hopper 8. The sides of the carrier frame include inwardly extending top flanges 32 for supporting the heads 30 of the bolts 28, and outwardly extending bottom flanges 33 for rotatably supporting horizontally disposed rollers 34. The rollers 34 extend outwardly beyond the flanges 33 into the V-shaped tracks defined by the sides 6 and 7 of the top 2 of the table 1.

The carrier 31 and the hopper 8 mounted thereon are moved longitudinally of the table 2 over the grid 14 by means of a pair of chains 35. One end 36 of each chain 35 is connected to a bracket 37 on one corner of the hopper carrier 31. The chain 35 passes around sprockets 38 and 39 at one end of the table 2, beneath the table, around sprockets 40 and 41 at the other end of the table, and is connected to another bracket on another corner of the hopper carrier 31 on the same side as the first bracket 37. The sprockets 38 and 39, at one end of the table are rotatably mounted on brackets 42 and 43 extending outwardly from the end 5 of the frame and from the legs 3, respectively. The lower sprockets 40 at the other end of the table are rotatably mounted in brackets 43 extending outwardly from the legs 3. The uppermost sprockets 41 at such other end of the table are mounted on a shaft 44 for rotation therewith. The shaft 44 is rotatably mounted in pillow block bearings 45 on the end 4 of the top 2. One end 46 of the shaft 44 extends beyond the bearing 45, and is provided with a handle 47 for rotating the shaft 44 and thus driving the chains 35 around the sprockets 38, 39, 40, and 41. Thus, the carrier 31 and the hopper 8 can be made to move longitudinally back and forth along the table 2 for dispensing a brick forming composition into the grid 14.

Figure 2:
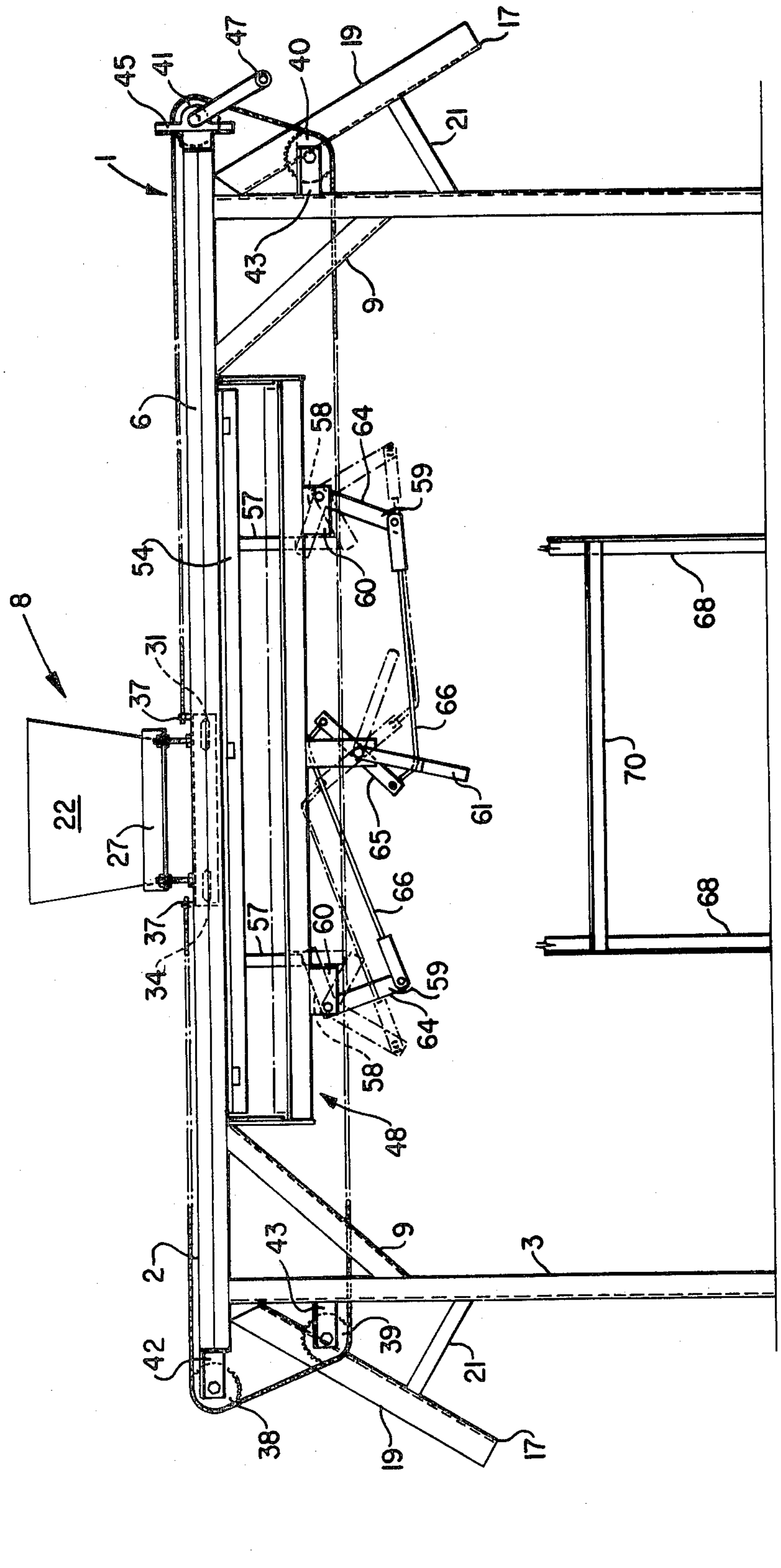
FIG. 2 is an elevation view of the machine of FIG. 1.
Figure 3:
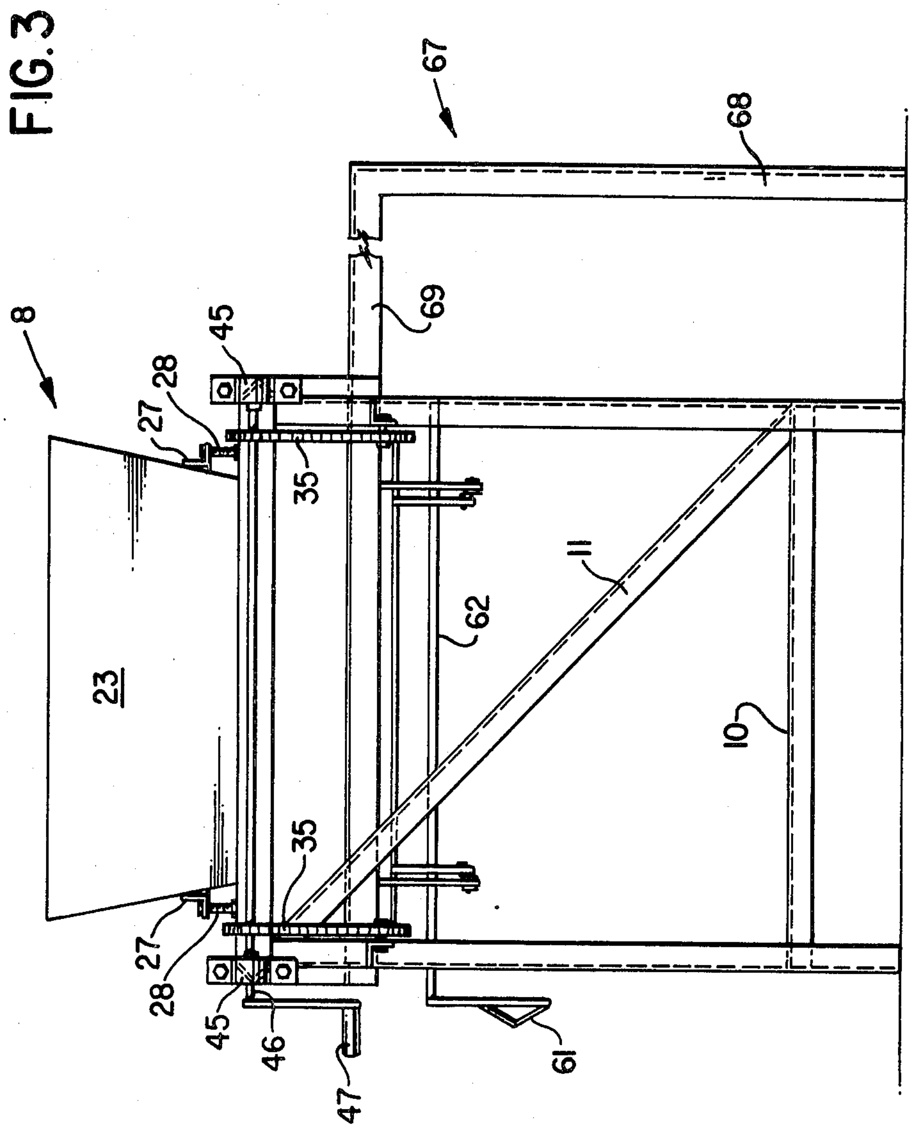
FIG. 3 is an end view of the machine of FIGS. 1 and 2.
Figure 5:
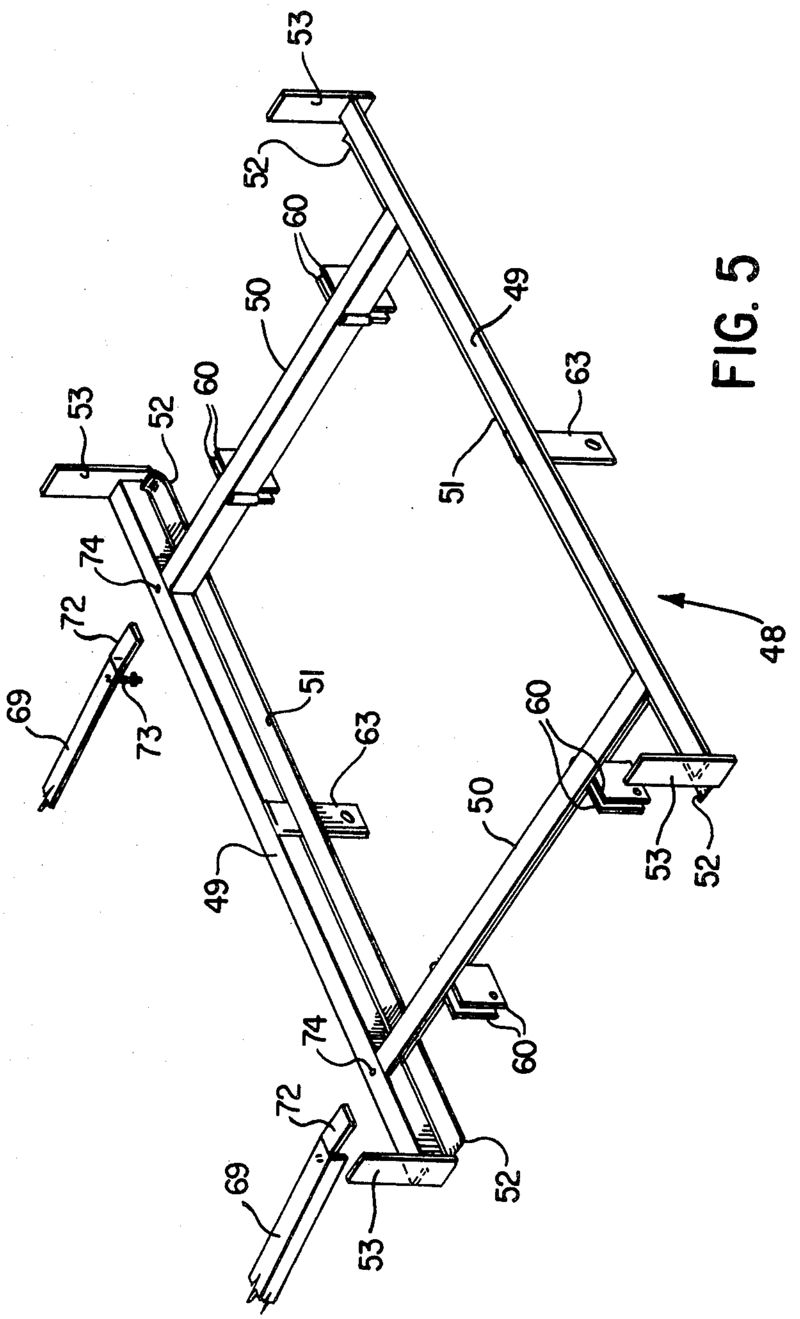
FIG. 5 is a perspective exploded view of a shelf and part of a pallet stand used in the machine of FIGS. 1 to 4.

Referring specifically to FIGS. 2 and 5, a shelf generally indicated at 48 is mounted beneath the table top 2. The shelf 48 includes longitudinally extending, inverted L-shaped sides 49, with crossbars 50 extending therebetween near each end. Flat strips 51 with upturned ends 52 are connected to the bottoms of the crossbars 50 at each end thereof and spaced slightly from the sides 49. Arms 53 extend upwardly from the ends of the sides 49 for connecting the shelf 48 to the table top 2. The top ends of the arms 53 are welded to the table top.

Figure 6:
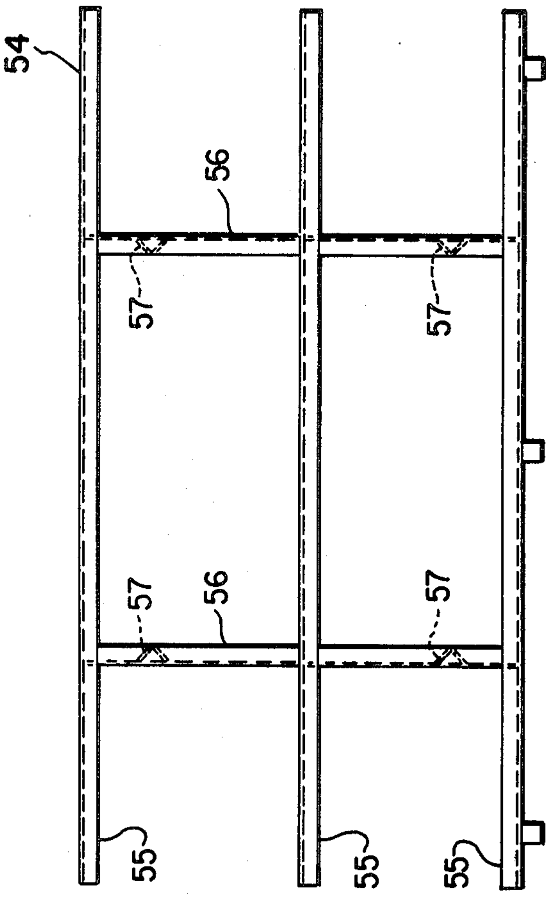
FIG. 6 is a plan view of a pallet carrier used in the apparatus of FIGS. 1 to 5.

The shelf 48 is intended to support a pallet carrier 54 (FIGS. 2 and 6) for vertical movement towards and away from the molding grid. The pallet carrier 54 is merely a frame defined by longitudinally extending bars 55 and crossbars 56 interconnecting such bars 55. Four short legs 57 extend downwardly from the crossbars 56. In order to raise the pallet carrier 54 from the rest or lower position (shown in phantom outline in FIG. 2) to the elevated or molding position (shown in solid lines in FIG. 2), the bottoms of the legs 57 are engaged by arms 58 of L-shaped levers 59. The levers 59 are pivotally mounted in brackets defined by a pair of parallel plates 60 depending from the crossbars 50 of the shelf 48. The levers 59 are operated by grasping a handle 61 on one end of a shaft 62 and turning the shaft. The shaft 62 is rotatably mounted in the bottom ends of arms 63 extending downwardly from the sides 49 of the shelf 48. The other arm 64 of each lever 59 is connected to the shaft 62 by a linkage. The linkage includes a straight lever 65 mounted on the shaft 62 and a generally L-shaped rod 66 pivotally connected at one end to such other arm 64 of the L-shaped lever 59, and at the other end to one end of the straight lever 65.

Rotation of the shaft 62 results in simultaneous rotation of the levers 65, with resulting movement of the rods 66 and rotation of the levers 59 to raise or lower the pallet carrier 54.

The only remaining element of the machine is a pallet stand generally indicated at 67. The pallet stand 67 is merely an inverted L-shaped frame defined by a pair of legs 68 and top arms 69 which are interconnected by crossbars 70 and 71, respectively. The outer free ends of the arms 69 are provided with planar, downwardly inclined fingers 72 which rest on the ends of crossbars 50 of the shelf 48. A bolt 73 on the bottom outer free end of each arm 69 rests in a hole 74 in the side 49 of the shelf 48 for locating the pallet stand 67 relative to the shelf 48.

OPERATION

In operation, a pallet in the form of a flat wooden panel (not shown) is slid along the pallet stand 67 onto the pallet carrier 54. The handle 61 is turned to raise the pallet carrier 54 and the pallet into the molding position (shown in solid lines in FIG. 2). Then, with the hopper 8 at one end of the table 1, brick forming composition (not shown) is placed in the hopper 8. The hopper 8 is caused to move along the table 1 above the grid 14 to dispense such composition into the molds defined by the grid 14 and the pallet. As the hopper 8 passes along the table 2, excess brick forming composition is wiped from the top of the grid 14 by the rubber strips 24. When the hopper 8 reaches the other end of the table 1, the excess brick forming composition is swept into one of chutes 17 for return to a mixer or for discarding as waste.

Then, the handle 61 is again turned to lower the pallet carrier 54 to the bottom or rest position (shown in phantom outline in FIG. 2) on the shelf 48, and the pallet and bricks thereon are slid from beneath the table top 2 via the pallet stand 67. The above operations are repeated using a new pallet.

Thus, there has been described a relatively simple, yet efficient brick molding machine. Of course, minor changes can be made without adversely affecting the operation of the machine. For example, the handle 47 can be replaced with a reversible motor (not shown) for driving the chains 35 and moving the hopper 8.

Further modifications and alternative embodiments of the invention will be apparent to those skilled in the art in view of the foregoing description. Accordingly, this description is to be construed as illustrative only and is for the purpose of teaching those skilled in the art, the manner of carrying out the invention. It is further understood that the form of the invention herewith shown and described is to be taken as the presently preferred embodiment. Various changes may be made in the shape, size and general arrangement of components, for example, equivalent elements may be substituted for those illustrated and described herein, parts may be used independently of the use of other features, all as will be apparent to one skilled in the art after having the benefits of the description of the invention.

What I claim is:

1. A brick molding machine comprising table means, said table means including a top and legs supporting said top; grid means in said top for defining sides of molds for molding bricks; shelf means beneath said grid means; carrier means on said shelf means for carrying a pallet; elevating means for moving said pallet carrier and a pallet from a rest position on said shelf to a molding position in which said pallet abuts the bottom of said grid means to define the bottom of said molds; hopper means for dispensing brick forming composition into said molds; and drive means for moving said hopper means along said table top above the molds.

2. A machine according to claim 1, including a hopper carrier slidably mounted on said table means for movement along the length thereof over said grid means; and roller means on said hopper carrier, the top of said table means including sides defining tracks for receiving said rollers.

3. A machine according to claim 2, wherein said hopper carrier includes a frame surrounding said hopper means; and means supporting said hopper means on said frame.

4. A machine according to claim 1, wherein said hopper means includes flexible wiper means for engaging the top of said grid means during passage of the hopper means over the grid means for removing excess brick forming composition from the top of said grid.

5. A machine according to claim 4, including chute means at each end of the top of said table means for discharging excess brick forming composition from said table means.

6. A machine according to claim 2, wherein said drive means includes chain means having ends connected to the ends of said hopper carrier; sprocket means at each end of said table means for supporting said chain means; shaft means carrying selected of said sprocket means; and handle means for rotating said shaft means.

7. A machine according to claim 1, wherein said elevating means includes lever means pivotally mounted on said shelf means; handle means; and linkage means connecting said handle means to said lever means for causing said lever means to engage and move said pallet carrier means.

8. A machine as claimed in claim 1 wherein said top includes planar end panels adjoining the ends of said grid means and substantially flush with the top surface of the grid means such that the hopper means moves over a respective said end panel as it passes from the respective end of said grid means, said hopper means including lower edges of flexible material for wiping along the upper surface of said grid means so as to remove any excess brick forming composition from the top of the grid means before moving over one of said end panels, and chute means at the outer ends of said planar end panel for receiving excess brick forming composition swept from said planar end panels.

9. A machine as claimed in claim 1 wherein said grid means is fixedly positioned horizontally and vertically in said top, and means are provided for adjusting said hopper means vertically relative to said grid means.

10. A machine as claimed in claim 1 further comprising a pallet stand laterally adjoining said shelf means and having surfaces along which a pallet may be slidably moved laterally onto and from said shelf means and carrier means beneath said table when said carrier means is in its lowered rest position.

* * * * *